United States Patent
Anson et al.

(10) Patent No.: US 10,896,423 B2
(45) Date of Patent: Jan. 19, 2021

(54) PASSING A TRUSTED TRANSACTION SIGNAL

(71) Applicant: MICROSOFT TECHNOLOGY LICENSING, LLC, Redmond, WA (US)

(72) Inventors: Samuel B. Anson, Bothell, WA (US); Stuart H. Dwyer, Sammamish, WA (US); Shoou-Jiun Wang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 530 days.

(21) Appl. No.: 15/490,405

(22) Filed: Apr. 18, 2017

(65) Prior Publication Data

US 2018/0211256 A1    Jul. 26, 2018

Related U.S. Application Data

(60) Provisional application No. 62/450,424, filed on Jan. 25, 2017.

(51) Int. Cl.
*G06Q 20/40* (2012.01)
*G06Q 20/24* (2012.01)

(52) U.S. Cl.
CPC ....... *G06Q 20/4016* (2013.01); *G06Q 20/405* (2013.01); *G06Q 20/409* (2013.01); *G06Q 20/4014* (2013.01); *G06Q 20/24* (2013.01)

(58) Field of Classification Search
CPC .. G06Q 20/40; G06Q 20/4014; G06Q 20/405; G06Q 20/409; G06Q 20/24; G06Q 20/4016; G06Q 30/0609
See application file for complete search history.

(56) References Cited

U.S. PATENT DOCUMENTS 9,367,844 B1 * 6/2016 Hu ................... G06Q 20/4016
2014/0188726 A1 * 7/2014 Vasantham .......... G06Q 20/322
705/44

(Continued)

FOREIGN PATENT DOCUMENTS

WO    WO-2016044310 A1 *  3/2016 ......... G06Q 20/4016

OTHER PUBLICATIONS

Leung et al., "On Designing a Flexible E-Payment System with Fraud Detection Capability", Aug. 9, 2004, Proceedings of the IEEE International Conference on E-Commerce Technology, all pages (Year: 2004).*

*Primary Examiner* — Hani M Kazimi
*Assistant Examiner* — Adam Hilmantel
(74) *Attorney, Agent, or Firm* — Shook, Hardy and Bacon, L.L.P.

(57) ABSTRACT

A trusted transaction signal is passed from a merchant to an account provider. A merchant receives a payment account association with a transaction between a customer and the merchant, and determines a level of risk for the transaction. If the customer is unknown to the merchant, the trust level is determined to be a default trust level. If the customer is known to the merchant, then a risk assessment determines whether the trust level is the default trust level, or a second, greater, trust level. A transaction notification is sent to the account provider. When the trust level is the default level, the notification includes a merchant ID that identifies the merchant and signifies the default trust level for the transaction. When the trust level is the greater level, the notification includes a different merchant ID that also identifies the merchant, but represents the second trust level for the transaction.

20 Claims, 4 Drawing Sheets

(56) References Cited

U.S. PATENT DOCUMENTS

| | | | | |
|---|---|---|---|---|
| 2014/0304130 A1* | 10/2014 | Winters | ............ | G06Q 30/0226 |
| | | | | 705/35 |
| 2015/0012430 A1* | 1/2015 | Chisholm | .............. | G06Q 20/34 |
| | | | | 705/44 |
| 2015/0220929 A1* | 8/2015 | Monk | ...................... | G07C 9/00 |
| | | | | 705/13 |
| 2015/0287037 A1* | 10/2015 | Salmon | ............. | G06Q 20/3224 |
| | | | | 705/44 |
| 2016/0078444 A1* | 3/2016 | Tomasofsky | ......... | G06Q 20/409 |
| | | | | 705/44 |
| 2016/0260100 A1* | 9/2016 | Wiesman | ............... | G06Q 20/34 |
| 2017/0069003 A1* | 3/2017 | Barta | ................ | G06Q 30/0185 |

\* cited by examiner

PASSING A TRUSTED TRANSACTION SIGNAL

This application claims the benefit of U.S. Provisional Application No. 62/450,424, titled "Passing a Trusted Transaction Signal," filed Jan. 25, 2017 which is hereby expressly incorporated herein by reference in its entirety.

BACKGROUND

Providers that issue financial instruments such as credit cards, charge cards, debit cards, and so forth, typically utilize in-house and outsourced risk-assessment systems to determine whether to trust, and accept, a transaction submitted to the provider by a merchant. Typically, the provider evaluates details of the transaction such as the account number, the account holder, the amount of the purchase, and so forth. Risk assessment for a transaction may take into account such factors as the typical spending habits of a card holder, e.g., the amounts spent, the types of purchases made, the geographical locations of purchases, and so forth. However, based on such factors, providers sometimes decline transactions that are not fraudulent, such as when a customer makes a purchase while traveling, or a purchase of an item not typically purchased by that customer. Other factors, of which the provider has no knowledge, could potentially indicate that a seemingly fraudulent transaction is actually a legitimate transaction, if such factors could be taken into consideration.

Both providers and merchants can potentially lose business if legitimate transactions are declined. For example, when an initial purchase attempt is declined, the customer may try to make the same purchase from a competing merchant, and/or may use a credit card from a different provider to make the purchase. Often, the credit card from the different provider then becomes the customer's first choice of cards to use, and the provider loses interest income and/or interchange income, as well as future spend events.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

An embodiment is directed toward systems and methods for passing a trusted transaction signal from a merchant to an account provider. In one embodiment, when a merchant receives an account identifier for a payment account, such as a credit card account, in association with a transaction between a customer and the merchant, the merchant determines a level of risk for the transaction, i.e., whether or not the transaction is a trusted transaction. If the customer is not known to the merchant, then the trust level is determined to be a default trust level. If the customer is known to the merchant, then a risk assessment is performed to determine whether the trust level is the default trust level, or whether it is a second, greater, trust level, based on information known to the merchant about the customer. A transaction notification is sent to the customer's card issuer, such that when the trust level is the default trust level, then the transaction notification includes a merchant ID that identifies the merchant and represents the default trust level for the transaction, and when the trust level is the greater trust level, the transaction notification includes a different merchant ID that also identifies the same merchant, but represents the second trust level for the transaction.

BRIEF DESCRIPTION OF THE DRAWINGS

Aspects of the invention are described in detail below with reference to the attached drawing figures, wherein.

DETAILED DESCRIPTION

Figure 1:
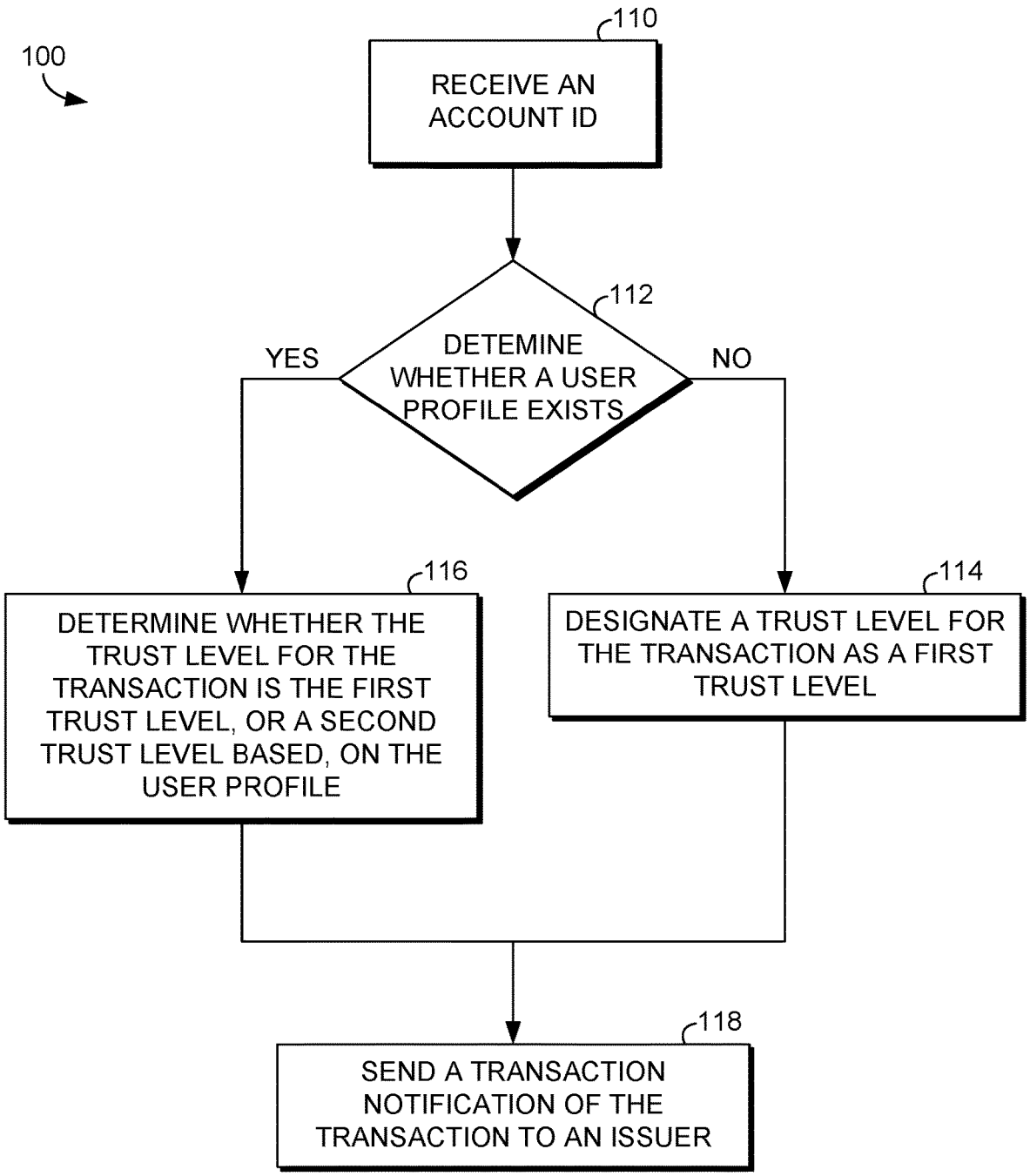
FIG. 1 is a flowchart of a method of authenticating a transaction that utilizes an account, and is suitable for implementing aspects of the invention.

Providers that issue financial instruments such as credit cards, charge cards, debit cards, and so forth, typically utilize in-house and outsourced risk-assessment systems to determine whether to trust, and accept, transactions submitted by merchants. However, decisions rendered by such issuers lack insight into the purchase behavior, patterns and specifics that are known to individual merchants. Providers therefore can and will decline existing good customers due to lack of detailed insight into a transaction. A merchant, however, is in a position to potentially have more insight into whether a particular transaction is fraudulent, based on a history of transactions between the customer and the merchant, as well as other information the merchant may possess that is associated with the customer. Closing the gap between the issuer's knowledge and a merchant's knowledge would enable the issuer to reduce the number of erroneous declines; however, the current standard authorization protocols do not facilitate this.

In some scenarios, a good customer with a legitimate spending pattern may be viewed out of context by a bank fraud system, resulting in a decline. For example, a sequence of purchases made in a short amount of time may be viewed as suspicious by an issuer. In other cases, an unusual purchase, or a purchase made in another country or remote geographical location, may be viewed as suspicious, and be declined. As a result, the declined customer may attempt the same transaction at a competing merchant, which is a loss for the original merchant, or may attempt the purchase using a financial instrument from a different provider, which is a loss for the original provider.

One example in which a customer may be declined is when making in-game or in-app purchases, such as through a Microsoft Xbox console. In-game purchases may appear suspicious to a card provider, for example, when multiple purchases are made in rapid succession, or for other reasons. However, many long term/solid spend customers may prefer to access content through their game console, and will continue to purchase via their console despite initial declines, which could result in the customer switching to a different issuer's card, as described above. The new card may likely become the customer's preferred card not only for Xbox purchases, but for other purchases as well. The declining bank or other institution then loses interest income/interchange income, and also for future spend events. However, the merchant (Microsoft in this example) may know from a customer's purchase history that the in-game transactions are not suspicious, and that the customer has a good record of valid purchases with the merchant.

Some embodiments of the present invention are directed to technological improvements that allow a party, such as a merchant, to pass a trust signal to an issuer, such as a bank, indicating whether the merchant has determined that a particular transaction is a trusted transaction. In an embodiment, the unconventional use of existing electronic transaction technology and protocols results in enabling a merchant to communicate a trust level, for a particular transaction, to a bank or other provider without modifying or circumventing standard authentication protocols, and without involving a "middleman" or third party. The provider, upon receiving such a trust level from the merchant, may opt to trust the transaction without performing its own risk assessment, or may utilize the received trust level as an additional factor in its risk assessment of the transaction.

It should be understood that the figures and embodiments described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each block of the methods discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Turning now to FIG. 1, a flow diagram is provided illustrating one example method 100 for authenticating a transaction that utilizes an account. Method 100 is but one example of a suitable method and is not intended to suggest any limitation as to the scope of use or functionality of the technology described herein. Neither should method 100 be interpreted as having any dependency or requirement relating to any one or combination of components illustrated. At step 110, an account identifier (ID) associated with a transaction between a customer and a merchant is received by the merchant. The account ID identifies the account, such as a credit account, debit account, and so forth, to be utilized for payment. The account may be associated with a credit card, debit card, or other financial instrument issued to the customer by an issuer. The issuer may be a bank, credit union, or other financial institution.

At step 112, a determination is made as to whether a user profile exists for a user (e.g., the customer) associated with the account ID. The user profile includes various data about the user, and may include information such as personal information, e.g., name, address or other contact information, user preferences, identification of accounts the user has with the merchant, identification of other accounts associated with the user, purchase data, and so forth. The purchase data may reflect purchases made on web sites, through applications, in physical stores, and other locations. Based on the user profile, the merchant may be able to perform risk assessments for transactions associated with a user's account.

If the user profile does not exist, then at step 114 a first trust level is designated as the trust level for the transaction. In an embodiment, the first trust level is a default trust level that is not based on a history of transactions between the user and the merchant, either because such a history of transactions does not exist, or because there is too little history. The default trust level signifies a "typical" or "normal" level of trust, such as when there are no immediate indications of fraud associated with the transaction, but at the same time, there may have been no risk analysis beyond the circumstances of the current transaction; or, if risk analysis has been performed, no conclusion can be drawn as to whether the transaction should be trusted beyond the default trust level.

If the user profile does exist, then at step 116, a determination is made as to whether the trust level for the transaction is the first trust level, or a second trust level, based on the user profile. In an embodiment, the second trust level is determined based at least in part on a history of transactions between the user and the merchant, and indicates that the transaction is trusted beyond, or more than, the default trust level. In some embodiments, the second trust level is determined based on factors other than, or in addition to, a history of transactions between the user and the merchant. Such factors may include credit scores, demographics, geographical location, criminal records, other public records, and generally any information that may be useful in determined a trust level. However, even when the customer is known to the merchant, i.e., when the user profile exists, it may be that the merchant is unable to establish a trust level for the transaction beyond the default trust level. For example, there may too little purchase history, the profile may be too new, the profile may indicate a mix of "good" and "bad" behaviors or transactions, and so forth. In an embodiment, the default trust level does not imply that there is no history of transactions for the user, but rather that no other trust level can be determined based on the available information. In an embodiment, determining whether the trust level for the transaction is the first trust level or a second trust level based on the user profile includes determining a confidence level for the transaction based on the user profile, and determining the trust level based on the confidence level.

It should be noted that, when performing a risk assessment for a current transaction, the history of transactions between the user and the merchant need not include transactions for the particular credit card (or other financial instrument) utilized for the current transaction. A risk assessment may be performed even if the merchant has no transaction history for the currently-used financial instrument. For example, the merchant may have a transaction history for the same user, but for transactions that utilized one or more other financial instruments. The risk assessment may thus be associated with the particular user, rather than with a specific financial instrument. In an embodiment, the risk assessment is associated with the particular user because of an association between the transaction and a particular user account, e.g., the user may utilize a subscription or other type of account that has been established with the merchant for making purchases and or other transactions.

At step 118, a transaction notification of the transaction is sent to an issuer associated with the account. When the trust level for the transaction is the first trust level, the transaction notification includes a first merchant ID that identifies the merchant and represents the first trust level for the transaction. For example, a hypothetical first merchant ID might be "12301." In an embodiment, the first merchant ID identifies the merchant and provides a signal to the issuer that the merchant did not (or could not) determine that the transaction is trusted beyond the default trust level, and that the issuer should perform a risk assessment for the transaction if a risk assessment is desired.

On the other hand, when the trust level for the transaction is the second trust level, the transaction notification comprises a second merchant ID that identifies the same merchant, as does the first merchant ID, but represents the second trust level for the transaction. For example, a hypothetical second merchant ID might be "12305." In an embodiment, the second merchant ID identifies the same merchant and provides a signal to the issuer that the merchant determined that the transaction is trusted beyond the default trust level, based on the merchant's risk assessment, and that a risk assessment for the transaction by the issuer is not needed, or that the issuer may be able to incorporate the signal from the merchant into the issuer's risk assessment. Note that the hypothetical merchant IDs are not necessarily indicative of the formats or values associated with actual merchant IDs.

In some embodiments, a merchant may utilize additional trust levels. For example, the merchant may utilize separate merchant IDs to indicate "not trusted," "default trust level," "trusted," and "highly trusted." An issuer may then take different actions depending on the merchant-determined trust level for a transaction. For example, if the merchant ID signifies "highly trusted," then the issuer may choose not to perform its own risk assessment. Or, if the merchant ID signifies "trusted," as opposed to "highly trusted," then the issuer may choose to perform a risk assessment utilizing the merchant's trust signal (i.e., the merchant ID) as a factor in the risk assessment. In an embodiment, even if the merchant determines from its own risk assessment that a transaction should be declined, the merchant may still report the transaction to the issuer, though not completed, in order to provide the issuer with the notification that an attempted transaction associated with the account was not trusted by the merchant. That would enable the issuer to utilize such information in its own profile associated with the account. In one embodiment, the merchant and the issuer agree on a predefined set of criteria which, when met by a given transaction, results in the merchant utilizing a particular merchant ID indicating a particular trust level for the transaction. The issuer thus knows exactly what the particular trust level represents. In that case, the issuer may rely solely on the trust level provided by the merchant, and not perform a separate, or additional, risk assessment. In an embodiment, the issuer provides feedback to the merchant in response to the merchant ID. For example, when an issuer receives a merchant ID indicating that a transaction has a low trust level, but the issuer determines that the transaction should have a higher trust level, then the issuer may notify the merchant that the bank's risk assessment has determined a higher trust level for the transaction. Another example would include feedback to the merchant indicating that the bank's risk assessment determined that a transaction should not be trusted, regardless of having received a merchant ID indicating that the transaction was assigned a higher level of trust by the merchant.

Figure 2:
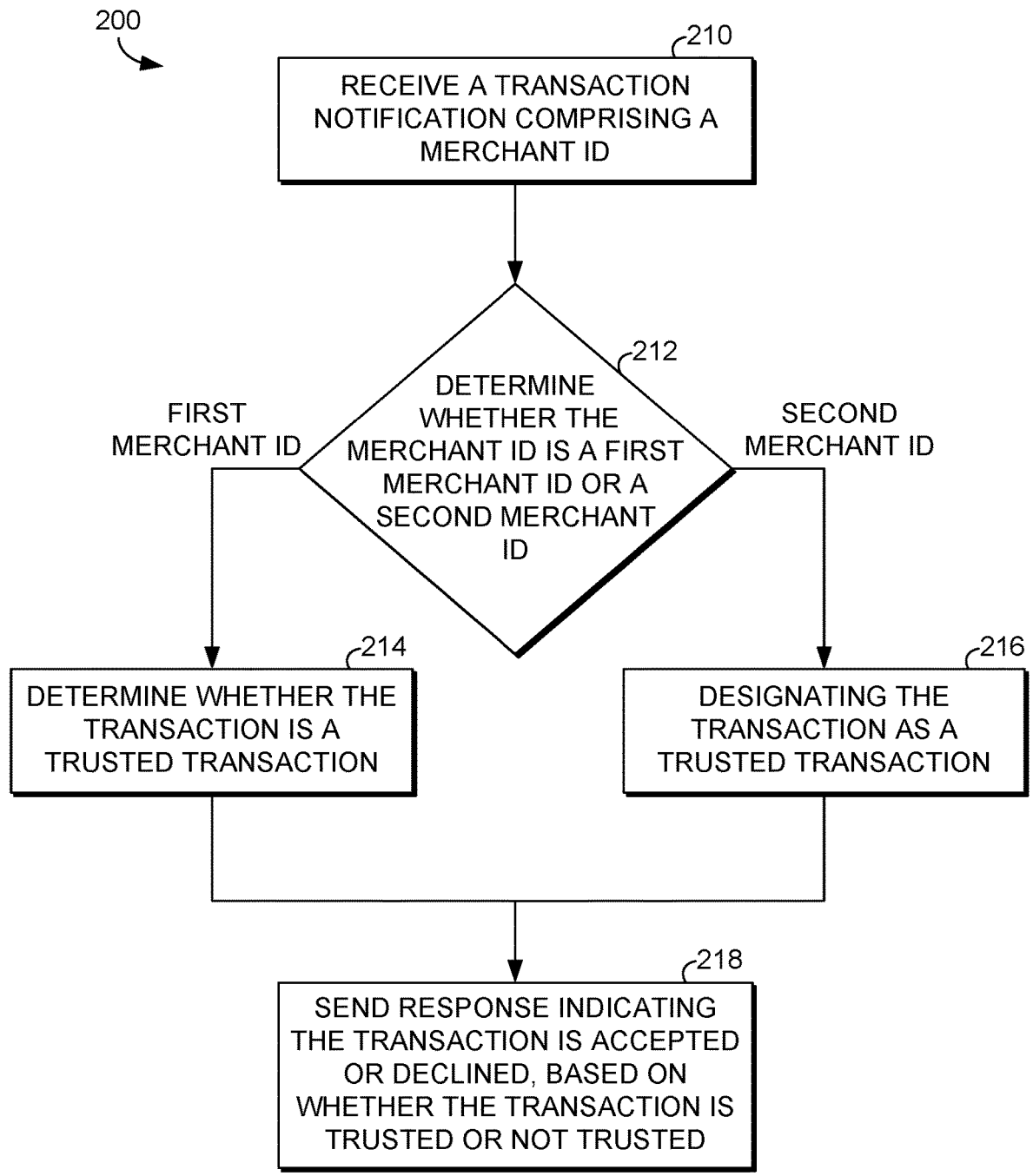
FIG. 2 is a flowchart of a method of authenticating a transaction that utilizes an account, and is suitable for implementing aspects of the invention.

Turning now to FIG. 2, a flow diagram is provided illustrating one example method 200 for authenticating a transaction that utilizes an account. Method 200 is but one example of a suitable method and is not intended to suggest any limitation as to the scope of use or functionality of the technology described herein. Neither should method 200 be interpreted as having any dependency or requirement relating to any one or combination of components illustrated. In an embodiment, method 200 is utilized by an issuer that receives notifications of transactions from a merchant. At step 210, a transaction notification of a transaction between a customer and a merchant is received. The transaction notification includes a merchant ID that identifies the merchant.

At step 212, a determination is made as to whether the merchant ID is a first merchant ID or a second merchant ID. The first merchant ID and the second merchant ID both identify the same merchant. However, the first merchant ID also signifies that the merchant determined a trust level for the transaction to be a default trust level, and the second merchant ID indicates that the merchant determined a transaction-specific trust level for the transaction. When the transaction-specific trust level is beyond, or higher than, the default trust level, it may be referred to as a "trusted level" as opposed to simply a default trust level. In an embodiment, the transaction-specific trust level signifies that the merchant determined a transaction-specific trust level for the transaction based at least in part on a history of transactions between the user and the merchant, or based on other aspects of the user profile.

When the merchant ID is determined to be the first merchant ID, which signifies the default trust level as determined by the merchant, then at step 214 a risk assessment for the transaction is performed by the issuer to determine whether the transaction is a trusted transaction. When the merchant ID is determined to be the second merchant ID that signifies a trusted level for the transaction, as determined by the merchant, then at step 216 the transaction is designated by the issuer as a trusted transaction, with no risk assessment performed by the issuer. In other words, the issuer accepts the merchant's trust level determination without performing its own risk assessment. In another embodiment, when the second merchant ID designates the transaction as a trusted transaction, the issuer performs its own risk assessment of the transaction, but utilizes the merchant's risk determination as a factor in its own risk determination to determine whether the transaction is trusted.

At step 218, a response to the transaction notification is sent. The response, which may be sent from the issuer to the merchant, indicates that the transaction is accepted or declined, based on whether the transaction is trusted or not trusted by the issuer.

Figure 3:
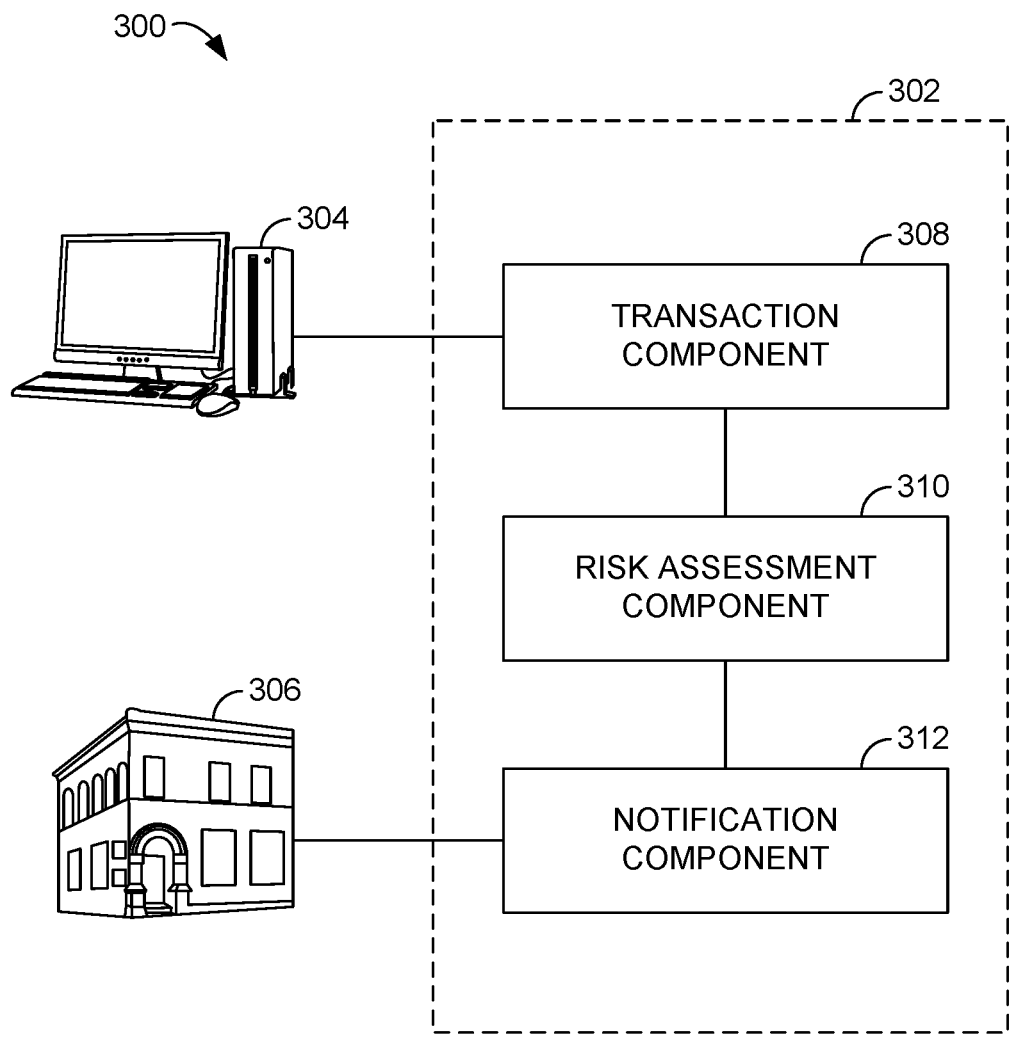
FIG. 3 is a block diagram of a system for authenticating a transaction that utilizes an account, and is suitable for implementing aspects of the invention.

Turning now to FIG. 3, a block diagram is provided illustrating an exemplary system 300 in which some embodiments of the present invention may be employed. Among other components not shown, system 300 includes a transaction component 308, a risk assessment component 310, and a notification component 312. In some embodiments, transaction component 308, risk assessment component 310, and notification component 312 are associated with a merchant 302. In some embodiments, system 300 includes one or both of a user terminal 304 and an issuer 306.

It should be understood that the system 300 shown in FIG. 3 is an example of one suitable computing system architecture. Each of the components shown in FIG. 3 may be implemented via any type of computing device, such as computing device 400 described with reference to FIG. 4, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of devices may be employed within the system 300 within the scope of the present invention. Each may comprise a single device or multiple devices cooperating in a distributed environment that collectively provide the functionality described herein. Additionally, other components not shown may also be included within the network environment.

With further reference to FIG. 3, transaction component 308 is configured to receive a transaction request which includes, among other data, an account ID which identifies an account to be utilized for payment during the transaction. Transaction component 308 is also configured to provide the account ID to risk assessment component 310. In an embodiment, the account is associated with a credit card, debit card, or other financial instrument issued to the customer by an issuer. The issuer may be a bank, credit union, or other financial institution.

Risk assessment component 310 is configured to determine a trust level for the transaction. This includes determining whether a user profile exists for a user associated with the account ID, and when the user profile does not exist, then designating a first trust level as the trust level for the transaction. In an embodiment, the first trust level is a default trust level that is not based on a history of transactions between the user and the merchant, and/or is not based on a user profile associated with the user. When the user profile does exist, then risk assessment component determines whether the trust level for the transaction is the first trust level, or a second trust level, based on the user profile. In an embodiment, the second trust level is determined based at least in part on a history of transactions between the user and the merchant. In an embodiment, determining whether the trust level for the transaction is the first trust level or a second trust level based on the user profile includes determining a confidence level for the transaction based on the user profile, and determining the trust level based on the confidence level. Risk assessment component 310 is also configured to provide the trust level to notification component 312.

Notification component 312 is configured to receive the trust level, and to send a transaction notification of the transaction to an issuer associated with the account. When the trust level for the transaction is the first trust level, the transaction notification includes a first merchant ID that identifies the merchant and represents the first trust level for the transaction. In an embodiment, the first merchant ID signifies that the issuer should perform a risk assessment for the transaction. When the trust level for the transaction is the second trust level, the transaction notification includes a second merchant ID that also identifies the same merchant, but represents the second trust level for the transaction. The second merchant ID signifies that a risk assessment for the transaction by the issuer is not needed (based on the risk assessment performed by the merchant), or that the issuer may utilize the second trust level determined by the merchant as a factor in the issuer's risk assessment of the transaction.

Figure 4:
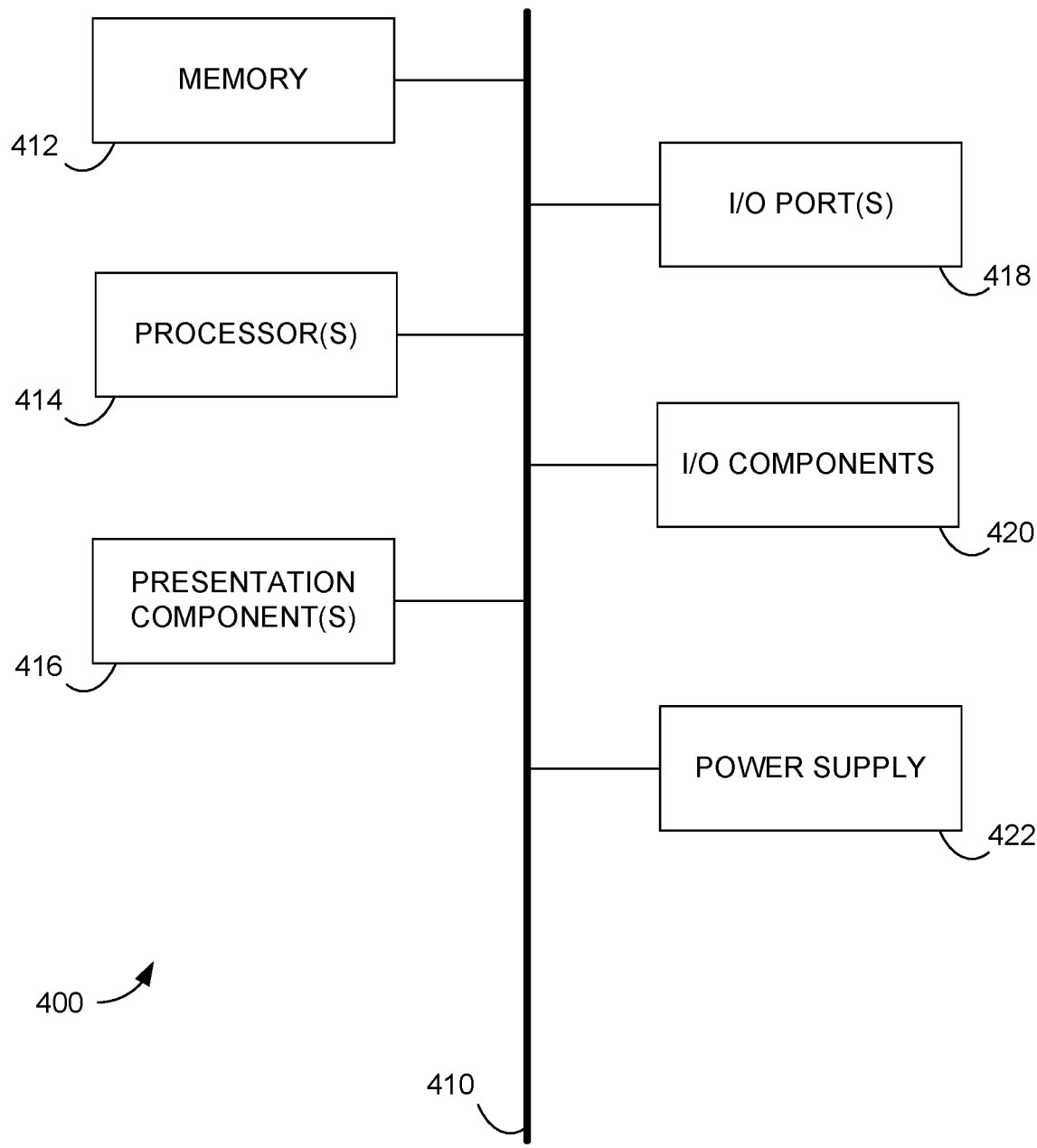
FIG. 4 is a block diagram of an exemplary computing environment suitable for use in implementing aspects of the technology described herein.

Having described some aspects of the technology presented herein, an exemplary operating environment in which aspects of the technology presented herein may be implemented is described below in order to provide a general context for various aspects of the technology presented herein. Referring initially to FIG. 4 in particular, an exemplary operating environment for implementing aspects of the technology presented herein is shown and designated generally as computing device 400. Computing device 400 is but one example of a suitable computing environment and is not intended to suggest any limitation as to the scope of use or functionality of aspects of the technology described herein. Neither should the computing device 400 be interpreted as having any dependency or requirement relating to any one or combination of components illustrated.

Aspects of the technology provided herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Aspects of the technology described herein may be practiced in a variety of system configurations, including hand-held devices, consumer electronics, general-purpose computers, more specialty computing devices, etc. Aspects of the technology described herein may also be practiced in distributed computing environments where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output (I/O) ports 418, input/output components 420, and an illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more aspects of the technology described herein. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

The technology has been described in relation to particular aspects, which are intended in all respects to be illustrative rather than restrictive. Alternative configurations will become apparent to those of ordinary skill in the art to which the technology described herein pertains without departing from its scope.

From the foregoing, it will be seen that the technology described herein is well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A method of authenticating a transaction that utilizes an account, wherein a merchant-provided trust level is determined for the transaction, comprising:
   at one or more computing devices associated with a merchant:
      communicating to an issuer, via a first network communication, predefined criteria indicating that a first merchant ID identifies the merchant and indicates a first trust level, and that a second merchant ID identifies the same merchant but indicates a second trust level;
      receiving an account identifier (ID) associated with the transaction between a customer and the merchant, wherein the account ID identifies the account, and wherein the account ID is received by the merchant;
      responsive to receiving the account identifier, determining whether a user profile associated with the merchant, comprising a history of transactions between the user and the merchant, exists for a user associated with the account ID;
      when the user profile does not exist, then designating the first trust level as the trust level for the transaction;
      when the user profile does exist, then determining whether the trust level for the transaction is the first trust level, or second trust level, based on the user profile;
   sending, via a second network communication, a transaction notification to the issuer associated with the account, wherein the transaction notification comprises a notification of the transaction and a merchant ID that identifies the merchant, wherein prior to sending the transaction notification:
      when the trust level for the transaction is the first trust level, then including the first merchant ID that represents the first trust level for the transaction within the transaction notification as the merchant ID, and
      when the trust level for the transaction is the second trust level, then including the second merchant ID that represents the second trust level for the transaction within the transaction notification as the merchant ID.

2. The method of claim 1, wherein the first trust level is a default trust level that is not based on a history of transactions between the user and the merchant.

3. The method of claim 2, wherein the first merchant ID signifies that the issuer should perform a risk assessment for the transaction.

4. The method of claim 1, wherein the second trust level is determined based at least in part on a history of transactions between the user and the merchant.

5. The method of claim 4, wherein the second merchant ID signifies that a risk assessment for the transaction by the issuer is not needed.

6. The method of claim 1, wherein determining whether the trust level for the transaction is the first trust level or the second trust level based on the user profile comprises:
   determining a confidence level for the transaction based on the user profile, and
   determining the trust level based on the confidence level.

7. The method of claim 1, wherein the account is a credit account associated with a credit card issued to the customer.

8. The method of claim 7, wherein the issuer is a financial institution that issues the credit card.

9. A system associated with a merchant for authenticating a transaction, between a user and the merchant, that utilizes an account, wherein a trust level is determined for the transaction, comprising:

one or more computing devices that:
communicate to an issuer, via a first network communication, predefined criteria indicating that a first merchant ID identifies the merchant and indicates a first trust level, and that a second merchant ID identifies the same merchant but indicates a second trust level;

a transaction component, comprising one or more processing devices, that:
receives a transaction request comprising an account identifier (ID), and
provides the account ID to a risk assessment component;

the risk assessment component, comprising one or more processing devices, that:
responsive to receiving the account identifier, determines whether a user profile associated with the merchant, comprising a history of transactions between the user and the merchant, exists for a user associated with the account ID,
when the user profile does not exist, then designates a first trust level as the trust level for the transaction,
when the user profile does exist, then determines whether the trust level for the transaction is the first trust level, or a second trust, level based on the user profile, and
provides the trust level to a notification component;

the notification component, comprising one or more processing devices, that:
receives the trust level,
provides a first merchant ID that identifies the merchant, the first merchant ID assigned to represent the first trust level,
provides a second merchant ID that identifies the merchant, the second merchant ID assigned to represent the second trust level,
sends, via a second network communication, a transaction notification to an issuer associated with the account, wherein the transaction notification comprises a notification of the transaction and a merchant ID that identifies the merchant, wherein prior to sending the transaction notification:
determines the merchant ID based on the predefined criteria communicated to the issuer to, wherein:
when the trust level for the transaction is the first trust level, includes the first merchant ID that represents the first trust level for the transaction within the transaction notification as the merchant ID, and
when the trust level for the transaction is the second trust level, includes the second merchant ID that represents the second trust level for the transaction within the transaction notification as the merchant ID.

10. The system of claim 9, wherein the first trust level is a default trust level that is not based on a history of transactions between the user and the merchant.

11. The system of claim 10, wherein the first merchant ID signifies that the issuer should perform a risk assessment for the transaction.

12. The system of claim 9, wherein the second trust level is determined based at least in part on a history of transactions between the user and the merchant.

13. The system of claim 12, wherein the second merchant ID signifies that a risk assessment for the transaction by the issuer is not needed.

14. The system of claim 9, wherein determining whether the trust level for the transaction is the first trust level or the second trust level based on the user profile comprises:
determining a confidence level for the transaction based on the user profile, and
determining the trust level based on the confidence level.

15. The system of claim 9, wherein the account is a credit account associated with a credit card issued to the customer.

16. The system of claim 15, wherein the issuer is a financial institution that issues the credit card.

17. One or more computer storage media having embodied thereon computer-usable instructions which, when executed by one or more processors, implement a method of authenticating a transaction that utilizes an account, wherein a merchant-provided trust level is determined for the transaction, comprising:

at one or more computing devices associated with a merchant:
communicating to an issuer, via a first network communication, predefined criteria indicating that a first merchant ID identifies the merchant and indicates a first trust level, and that a second merchant ID identifies the same merchant but indicates a second trust level;
receiving an account identifier (ID) associated with the transaction between a customer and the merchant, wherein the account ID identifies the account, and wherein the account ID is received by the merchant;
responsive to receiving the account identifier, determining whether a user profile associated with the merchant, comprising a history of transactions between the user and the merchant, exists for a user associated with the account ID;
when the user profile does not exist, then designating the first trust level as the trust level for the transaction;
when the user profile does exist, then determining whether the trust level for the transaction is the first trust level, or the second trust level, based on the user profile;
sending, via a second network communication, a transaction notification to the issuer associated with the account, wherein the transaction notification comprises a notification of the transaction and a merchant ID that identifies the merchant, wherein prior to sending the transaction notification:
when the trust level for the transaction is the first trust level, then including the first merchant ID that represents the first trust level for the transaction within the transaction notification as the merchant ID, and
when the trust level for the transaction is the second trust level, then including the second merchant ID that represents the second trust level for the transaction within the transaction notification as the merchant ID.

18. The one or more computer storage media of claim 17, wherein the first trust level is a default trust level that is not based on a history of transactions between the user and the merchant.

19. The one or more computer storage media of claim 18, wherein the first merchant ID signifies that the issuer should perform a risk assessment for the transaction.

20. The one or more computer storage media of claim 17, wherein the second trust level is determined based at least in part on a history of transactions between the user and the merchant.

* * * * *